United States Patent [19]

Moul et al.

[11] Patent Number: 4,542,504

[45] Date of Patent: Sep. 17, 1985

[54] SHARED DATA RECEIVER

[75] Inventors: Robert A. Moul, Naperville; William Thelen, Glen Ellyn, both of Ill.

[73] Assignee: AT&T Bell Laboratories, Murray Hill, N.J.

[21] Appl. No.: 525,112

[22] Filed: Aug. 22, 1983

[51] Int. Cl.[4] .......................... H04J 3/06; H03D 3/22
[52] U.S. Cl. ..................................... 370/100; 375/83; 375/111
[58] Field of Search .................. 370/112, 100; 375/83; 375/111

[56] References Cited

U.S. PATENT DOCUMENTS

| | | | |
|---|---|---|---|
| 3,459,893 | 8/1969 | Thomas | 375/111 |
| 3,908,084 | 9/1975 | Wiley | 375/119 |
| 3,961,138 | 6/1976 | Fellinger | 375/111 |
| 3,995,119 | 11/1976 | Pachynski, Jr. | 370/112 |
| 4,012,598 | 3/1977 | Wiley | 375/118 |
| 4,054,747 | 10/1977 | Pachynski | 375/118 |
| 4,119,796 | 10/1978 | Jones | 375/111 |
| 4,244,046 | 1/1981 | Brouard et al. | 370/62 |
| 4,382,297 | 5/1983 | Farrow | 370/112 |
| 4,389,616 | 6/1983 | Göckler et al. | 375/83 |
| 4,404,680 | 9/1983 | Perkins | 375/111 |
| 4,466,111 | 8/1984 | Bennett | 375/111 |

FOREIGN PATENT DOCUMENTS 2455269  3/1975  Fed. Rep. of Germany ...... 370/112

Primary Examiner—Douglas W. Olms
Assistant Examiner—Curtis Kuntz
Attorney, Agent, or Firm—Jerry W. Herndon

[57] ABSTRACT

A shared data receiver for multiplexing and phase synchronizing pulse data from a plurality of data sources. An input multiplexer sequentially samples the pulse state of each data source multiple times during each received time period equal to a pulse interval. A transition detector detects pulse transitions in the sample stream from the multiplexer and uses this information to select phase synchronized samples from the multiplexer stream representative of the pulses from the data sources.

8 Claims, 3 Drawing Figures

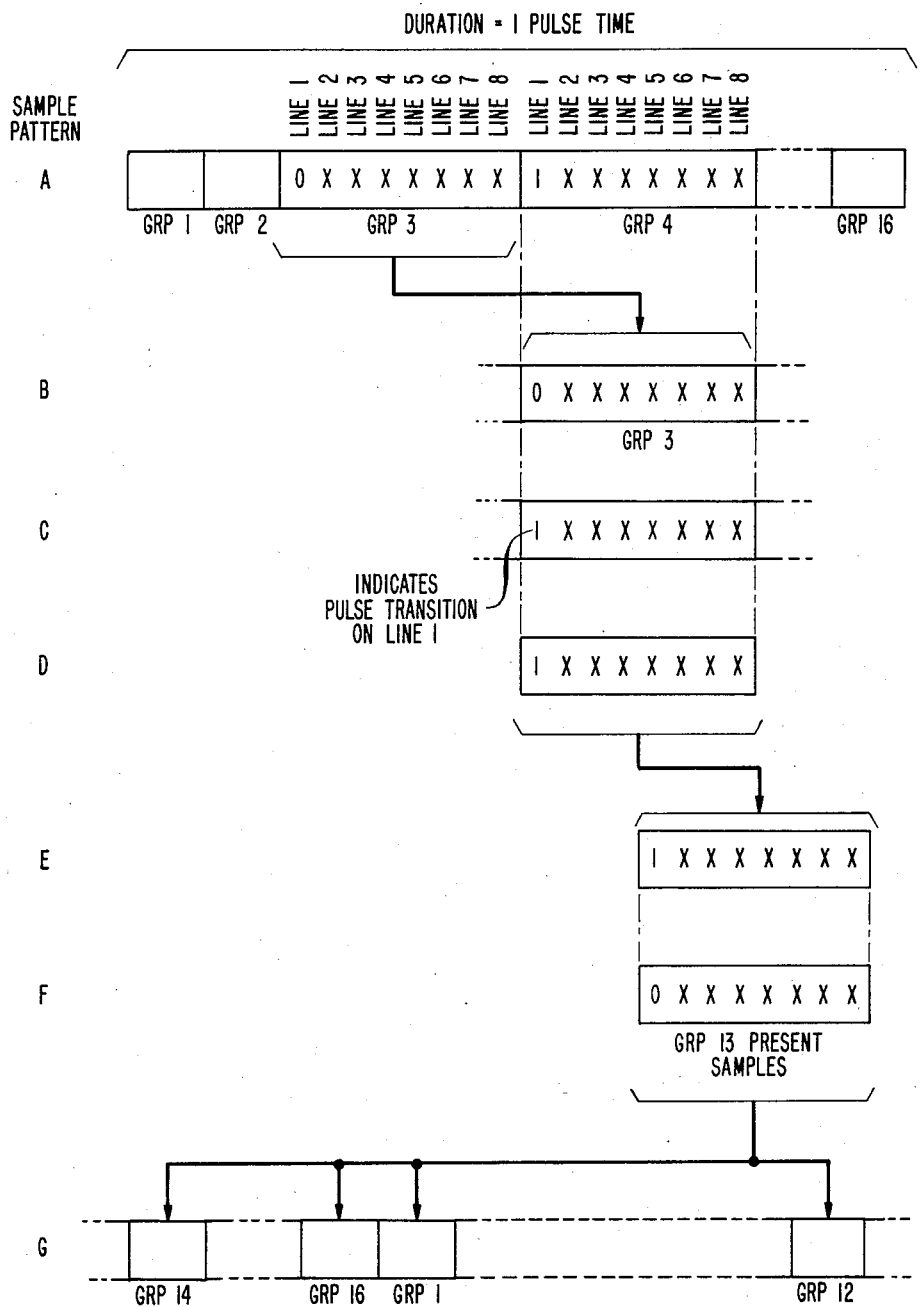

SHARED DATA RECEIVER

TECHNICAL FIELD

The invention pertains to data receivers. In particular, it pertains to a shared data receiver used to sample pulse data on a plurality of independent data lines each having substantially the same data rate. In a further respect, the invention pertains to a shared data receiver for multiplexing the data from the incoming lines to a single output data line.

BACKGROUND OF THE INVENTION

In various applications it is desired to synchronize data on a number of incoming data lines which are asynchronous with respect to each other to a single system clock for further processing of the data signals. In such applications in which the data rates on the lines are substantially the same, the problem becomes one of tracking and aligning the phase of the incoming data on each line to coincide with that of the system clock. Known methods of accomplishing such phase alignment typically involve independent phase adjusting of the arriving data on each line. For example, in U.S. Pat. No. 3,459,893, issued to G. W. Thomas on Aug. 5, 1969, data on plural data lines are synchronized in phase by separately comparing synchronization pulses of the individual data streams to a system clock interval and using the results of the comparisons to individually adjust variable delay elements in each input stream to align the data.

Phase realignment techniques such as the above require apparatus dedicated on a per line basis and, thus, are costly to implement. A simpler and more economical technique is desirable.

SUMMARY OF THE INVENTION

The invention is a shared data receiver for multiplexing pulses from a plurality of asynchronous data sources having substantially identical pulse rates and pulse intervals. An input multiplexor is controlled by receiver clock signals to cyclically and sequentially generate plural samples of each pulse on each data source. A transition detector detects pulse transitions on each data source from the stream of samples from the input multiplexor and, in response, outputs pulse transition signals for each data source. Sample selecting means uses the transition signals from the transition detector to select appropriate samples synchronized with respect to the receiver clock of the pulses on each data source from among the plural samples from the input multiplexor.

In an illustrative preferred embodiment, a plurality of shared data receivers are used to generate samples from different groups of incoming data sources. The resulting synchronized data streams from each shared data receiver are input to an output multiplexor which generates a final high-speed data stream of multiplexed data from all of the input data sources.

BRIEF DESCRIPTION OF THE DRAWING

In the drawing:

FIG. 3 shows illustrative sample patterns at selected points in a shared data receiver of FIG. 2 as an aid to understanding the operation of the receiver.

DETAILED DESCRIPTION

Figure 1:
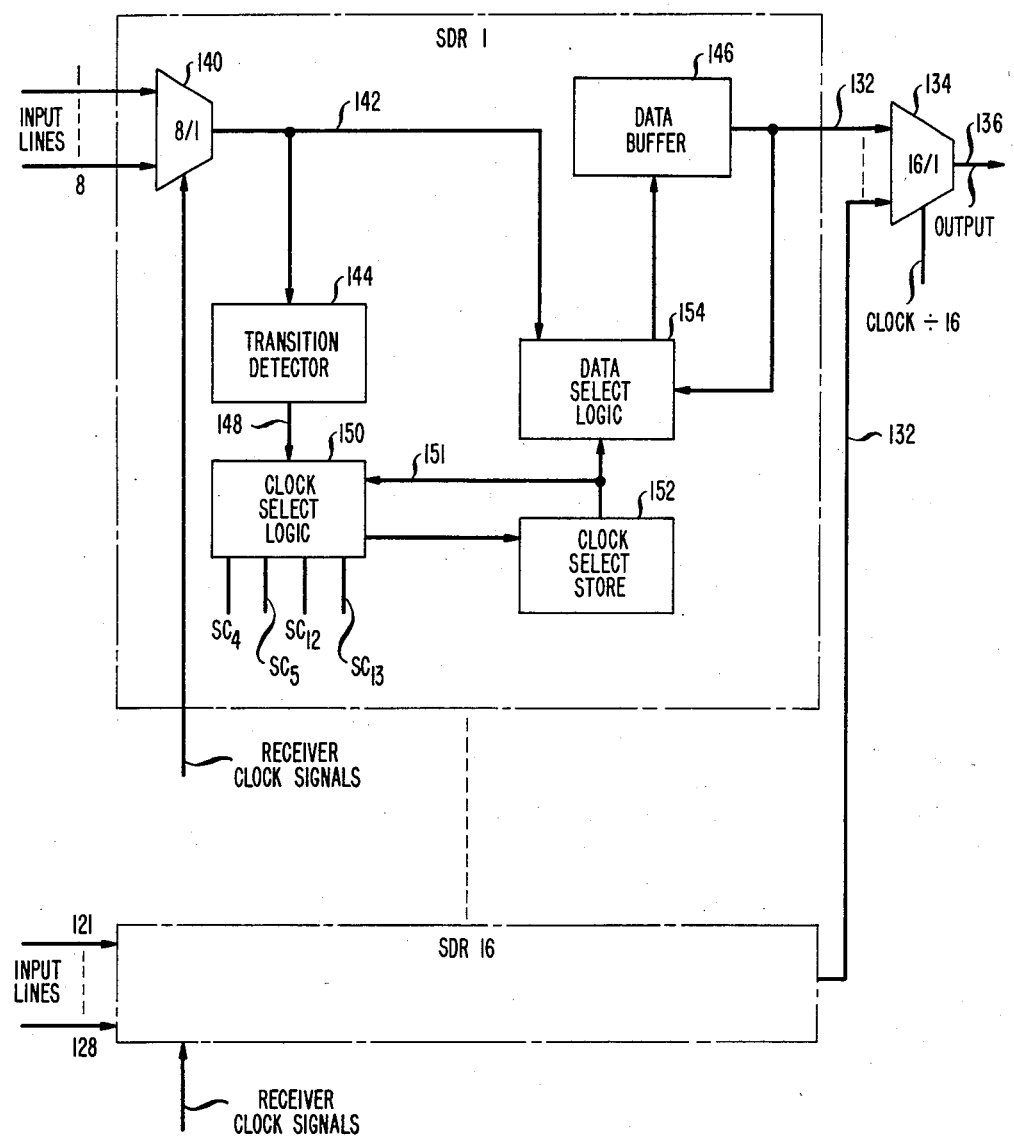
FIG. 1 shows a plurality of shared data receivers, SDR1-SDR16 each for generating and multiplexing pulse samples from a plurality of different input data lines, and an output multiplexor 134 for multiplexing selected samples generated by the shared data receivers onto a single output data line.

FIG. 1 shows an illustrative system consisting of a plurality of shared data receivers SDR1 through SDR16. Major functional circuit blocks of SDR1 are shown, it being understood that the remaining SDRs are identical to SDR1. Each receiver receives pulse data from a group of input data lines such as lines 1 through 8 associated with SDR1 and lines 121 through 128 associated with SDR16. By way of example, we may assume that the data rate on each line is nominally 4.8 kilobits per second and the pulse duration time on each line is nominally equal. Also shown is an output multiplexor 134 connected to outputs 132 of each of the SDRs. The purpose of the output multiplexor is to form a single illustrative 614.4→(128)(4.8) kilobit per second output data stream on output bus 136.

In our illustrative system, real data on the incoming lines tends to be bursty (noncontinuous). Fill data is used to form continuous input streams. Therefore, the continuous pulse stream on output bus 136 may contain noninformative fill data. This output stream is input to a shared formatter (not shown) which preliminarily processes the data to determine, among other things, the useful data. The shared formatter is the subject of patent application Ser. No. 481,057, entitled "Digital Multi-Customer Data Interface", filed on Mar. 31, 1983, in the names of Chu-Hinch-Johnson-Kafka-Stelte (Case 1-1-1-1-1). Its operation is unnecessary for an understanding of our invention and it will not be discussed further.

With reference to SDR1 in FIG. 1 as an example, each shared data receiver includes an input multiplexor 140 for multiplexing samples of the pulses from the associated incoming data lines 1 through 8. Multiplexors, such as 140 and 134 are conventional and well known by those skilled in the art. Accordingly, they will not be described in detail. Multiplexor 140 is operated at a clock rate fast enough to generate a plurality of samples of each pulse on each incoming data line. We have illustratively chosen to operate mutliplexor 140 at a clock rate 128 times faster than the nominal 4.8 kilobit data rate on an incoming data line. This means that in any given time period equal to the duration of a pulse on an incoming data line, mutliplexor 140 generates 16 samples from each of its 8 associated incoming data lines. These samples are sequentially and cyclically multiplexed onto the multiplexor output bus 142 of the SDR.

The stream of samples on bus 142 is input both to a transition detector 144 and a data select logic circuit 154. Transition detector 144 detects pulse transitions on each of the associated input data lines and outputs pulse transition signals on lead 148 for each input data line to a clock select logic circuit 150 in time correspondence to the samples at which the transition signals are detected.

The clock signals that control input multiplexor 140 are combined by conventional circuitry, not shown, to generate 16 subinterval signals $SC_1$ to $SC_{16}$. Stated somewhat differently, the generation of signals $SC_1$ to $SC_{16}$ divides each time period equal to the nominal pulse duration into 16 subintervals. During each subinterval marked by $SC_i$ to $SC_{i+1}$, input multiplexor 140 generates one sample from each of the input lines 1 through 8. Subinterval signals $SC_4$, $SC_5$, $SC_{12}$, and $SC_{13}$ are inputs to clock select logic circuit 150. If a pulse transition signal occurs for a given input line while either $SC_4$ or $SC_5$ is present, clock select logic 150 outputs a signal to clock select store 152 indicating that samples from this input line generated by multiplexor 140 during subinterval time $SC_{13}$ should be selected for output.

Conversely, if transition detector 144 detects a pulse transition on another input line while $SC_{12}$ or $SC_{13}$ are present, clock select logic 150 informs clock select store 152 that samples from this input line generated by input multiplexor 140 during subinterval time $SC_5$ should be selected for output. In this manner, the selected samples for output for each incoming data line are effectively synchronized in phase. A similar process is performed for all the associated incoming data lines by circuits 150 and 152. Once a subinterval sample select time has been selected for any given data line that selection is maintained by signals on lead 151 from clock select store 152 to clock select logic 150 until changed as discussed below. These same signals control, by means of data select logic circuit 154, the selection of the appropriate samples to be outputted from data buffer 146 to output multiplexor 134.

The pulses on any incoming data line may experience a slow drift in phase. Such a drift will eventually cause a signal, occasioned by a pulse transition, from the clock select logic circuit 150 to shift to the alternate subinterval select time, say $SC_{13}$, until a subsequent drift in phase occasions another change. Thus, for example, if samples generated at subinterval time $SC_5$ are being selected from incoming line 1 and the pulse phase on line 1 is slowly drifting, eventually a pulse transition will occur during $SC_4$ or $SC_5$. At this time, clock select logic 150 will instruct clock select store 152 to select line 1 samples generated at $SC_{13}$. This sample selection state will be maintained until changed by a subsequent pulse transition on line 1 occurring during $SC_{12}$ or $SC_{13}$. This phase drift detection mechanism allows the receiver to operate and receive pulses accurately in the presence of pulse jitter approaching a maximum of 37.5 percent of the pulse duration intervals.

Figure 2:
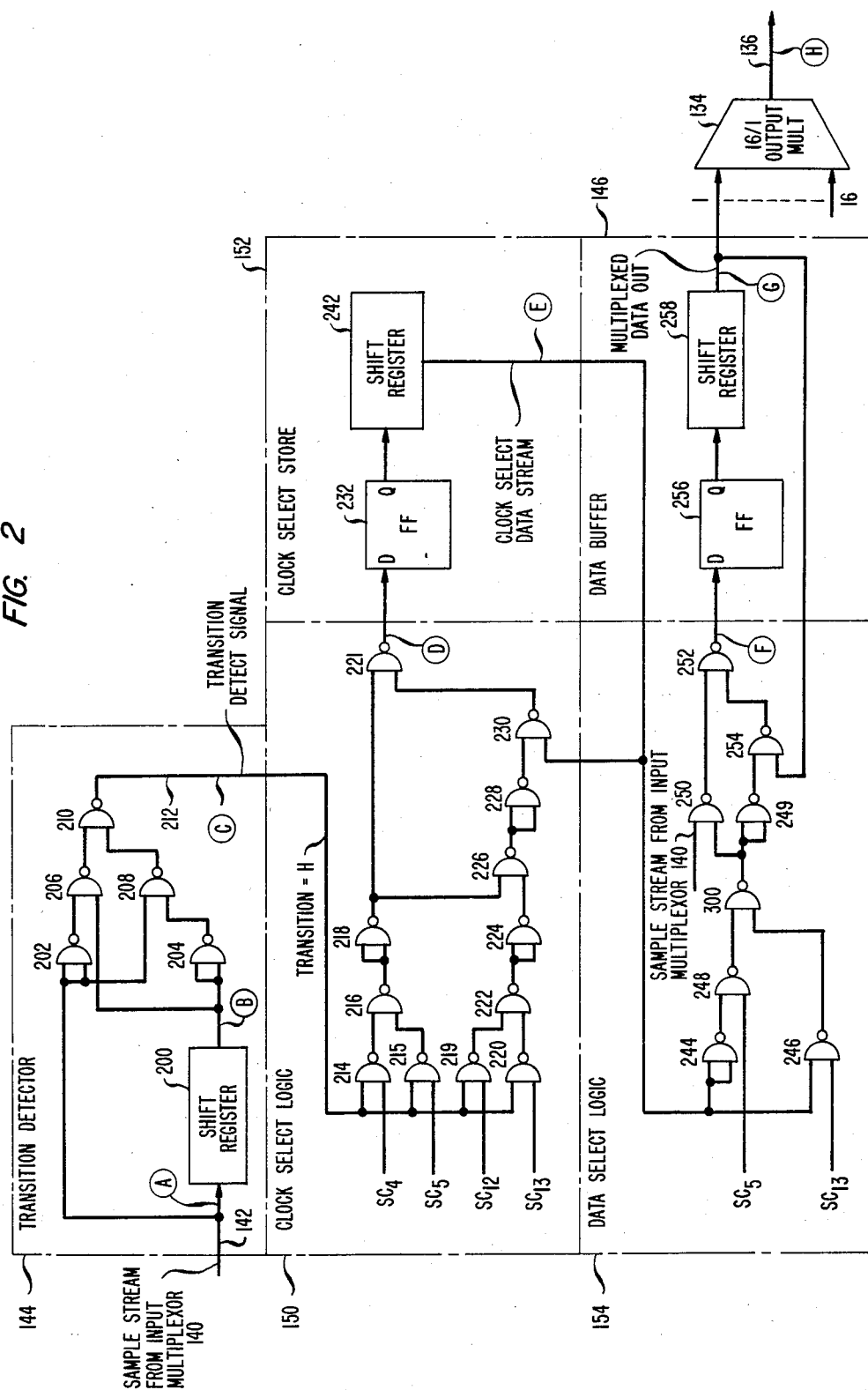
FIG. 2 shows the circuit details of a shared data receiver.

FIG. 2 shows the circuit details of SDR1. FIG. 3 shows illustrative patterns of samples that might exist at various points within SDR1. Encircled letters in FIG. 2 correspond to a sample pattern in FIG. 3 of the same letter.

The sample stream from input multiplexor 140 is input to the transition detector 144 on lead 142. Pattern A in FIG. 3 shows the format of samples generated by the input multiplexor 140 during one pulse duration time. The format is, of course, repetitive from pulse time to pulse time. The format consists of 16 groups of samples, each group consisting of sequential samples from lines 1 to line 8. Samples in respective groups 1, 2, 3 etc. are generated during the presence of respective subinterval signals $SC_1$, $SC_2$, $SC_3$, etc. We will use illustrative samples from line 1 to describe the operation of the SDR. It is assumed that a 0 to 1 pulse transition occurs on line 1 between the times that line 1 is sampled in groups 3 and 4. Pattern A, therefore, shows a line 1 sample of 0 in group 3 and a sample of 1 in group 4. Samples from the remaining lines are not of interest in this example, and therefore, are shown as Xs in pattern A. In FIG. 2, it is seen that the sample stream from input multiplexor 140 is input to a shift register 200 and logic circuitry comprising NAND gates 202, 204, 206, 208 and 210 in transition detector 144. Shift register 200 is an 8-bit shift register in this illustrative embodiment to provide delay such that at any given time samples at both its input and output are from the same incoming data line. Sample pattern B in FIG. 3 shows the group 3 samples delayed by shift register 200 to align these samples in time with the group 4 samples. Logic gates 202, 204, 206, 208 and 210 make up an EXCLUSIVE OR comparing logic circuit such that whenever the samples differ at the input and output of shift register 200, a high signal appears at the output 212 (lead 148 in FIG. 1) of the transition detector. Sample pattern C illustrates the output of transition detector. The detection of the line 1 transition is illustrated in sample pattern C resulting from the "exclusive or" comparison of the output of shift register 200 (pattern B) to the input of register 200 (pattern A) by the transition detector. The transition signal in pattern C enables four NAND gates 214, 215, 219 and 221 in clock select logic 150. Each of these NAND gates have respective subinterval signals $SC_4$, $SC_5$, $SC_{12}$ and $SC_{13}$ on its second input. If the transition signal on lead 212 occurs simultaneously with any of the subinterval signals $SC_4$, $SC_5$, $SC_{12}$ or $SC_{13}$, the respective NAND gate 214, 215, 219 and 221 is completely enabled to output $SC_4$, $SC_5$, $SC_{12}$ or $SC_{13}$, respectively. For example, it has been assumed that the transition signal from line 1 in pattern C occurs during subinterval signal $SC_4$. This enables NAND gate 214 causing a low signal to be applied to the upper input of NAND gate 216. In response, NAND gate 216 generates a high output which is inverted by NAND gate 218 to a low signal at its output. The output of NAND gate 218 is again inverted by gate 221 causing a high signal to be applied to the D (delay) input of flip-flop 232 of clock select store 152. The same result would have occurred had the transition signal from line 1 occurred simultaneously with subinterval signal $SC_5$. In that case, $SC_5$ would have been applied to gate 216 via gate 215. Alternatively, had the transition signal occurred during subintervals SChd 12 or $SC_{13}$, a low signal would have been applied to the D input of flip-flop 232 via gates 219 or 221, and 222, 224, 226, 228, 230 and 220. The state of flip-flop 232 determines which of two samples from line 1 in sample pattern A is selected for output, as will be seen. In particular, if pulse transitions are occurring during $SC_4$ or $SC_5$, then samples generated during $SC_{13}$ are selected. Alternately, if transitions are occurring during $SC_{12}$ or $SC_{13}$, then samples generated during $SC_5$ are selected. In the event that a transition signal on lead 212 does not occur simultaneously with any of the subinterval signals $SC_4$, $SC_5$, $SC_{12}$, $SC_{13}$ at any given sampling time, a signal is input to flip-flop 232 from clock select store 152 via gate 230 to maintain the sampling select time as will be seen below.

Pattern D in FIG. 3 shows the input to flip-flop 232 in the present example. The high signal in pattern D corresponding to the line 1 pulse transition at subclock time $SC_4$ is input to flip-flop 232 and thereafter this signal is input into an 8-bit shift register 242 of clock select store 152. Shift register 242 contains a bit for each of the incoming data lines. The state of each bit identifies the appropriate sample group (subinterval time) from which samples are to be selected for the respective line. An illustrative output of shift register 242 is shows as pattern E in FIG. 3. Pattern E is offset slightly to the right in FIG. 3 to indicate the delay caused by propagation of the signals through shift register 242. Since the shift register 242 output identifies the appropriate sample select group for each data line, its output signals are returned through gate 230 in clock select logic 150 to the input of flip-flop 232 to maintain the signal states in the shift register 242 between periods in which pulse transitions on the data lines do not occur during the presence of one of the subinterval signals $SC_4$, $SC_5$, $SC_{12}$, $SC_{13}$. Flip-flop 232 and shift register 242 are triggered on different edges of clock signals to insure a stable input condition to the shit register.

The output signals from shift register 242 are also input to data select logic circuit 154. Based on these signals, circuit 154 selects for each line specific samples for output that are generated during either $SC_5$ or $SC_{13}$. In the present example, the select signal for line 1 is high (1) as shown in pattern E. This signal enables gate 246 and disables gate 248 via gate 244 in data select logic 154. The remaining input to enabled gate 246 is subinterval signal $SC_{13}$. The $SC_{13}$ signal is gated through gate 246 and 300 to enable gate 250. The remaining input to gate 250 is the present sample stream from the input multiplexor 140. It is noted that the enabling signals to gates 246 and 248 are dealyed by 2 pulse duration intervals with respect to the samples that caused the enabling signals by shift registers 200 and 242. The present pulse state of line 1 at subinterval time $SC_{13}$ in this example is selected by gate 250 and transmitted through gate 252 to D (delay) flip-flop 256 in data buffer 146. The sample in flip-flop 256 is passed into shift register 258 of the data buffer. This shift register is also 8-bits long in the illustrative embodiment and stores the selected sample for each of the input lines 1 through 8 associated with this SDR.

As the samples are outputted from shift register 258, they are returned to gate 254 in data select logic 154. Gate 254 is enabled by gate 249 when gate 250 is disabled, and vice versa. We have assumed that gate 250 is enabled at $SC_{13}$ for line 1 in this example. Pattern F in FIG. 3 shows an assumed present line 1 sample state of 0 selected during $SC_{13}$ under control of the 1 signal for line 1 in pattern E. Because gate 254 is enabled during the remaining subinterval times $SC_{14}$ through $SC_{16}$ and $SC_1$ through $SC_{12}$, whatever samples are present in shift register 258 for line 1 as a result of the enabling of gate 250 are recirculated to the input of the shift register via gate 254 during these remaining subinterval times. The result is that the output of shift register 258 contains the selected samples for lines 1 through 8 for all subinterval times $SC_1$ through $SC_{16}$.

The output of shift register 258 is one of 16 inputs to the output multiplexor 134. The remaining inputs to the output multiplexor are from other SDRs as shown in FIG. 1. Output multiplexor 134 is operated at a clock speed 16 times slower than input multiplxor 140. During $SC_1$, output multiplexor 134 selects its input 1 connected to the output of SDR1. During $SC_1$, eight samples from lines 1 through 8 contained in shift register 258 are accepted by the output multiplexor. During $SC_2$ the output multiplexor accepts 8 samples from SDR2, and so on in a similar fashion. Therefore, on one pass of the output multiplexor from its input 1 to its input 16, $8 \times 16 = 128$ samples from lines 1 through 128 are read and multiplexed onto the output data line 136 by multiplexor 134. The above-described process then repeats to multiplex the next set of samples from each of the incoming data lines.

It is to be understood that the above-described arrangement is illustrative of the application of the principles of the invention, and that other arrangements may be devised by those skilled in the art without departing from the spirit and scope of the invention.

What is claimed is:

1. A synchronous shared data receiver for multiplexing pulse data from a plurality of data sources asynchronous with respect to each other and each having substantially identical nominal pulse transmission rates and pulse intervals, comprising input multiplexing means (140) operated by receiver clock signals occurring at an integer multiple of the nominal pulse transmission rate for cyclically sampling the data sources in succession to generate a prescribed number of interleaved plural samples of the pulse state of each data source during each consecutive time period equal in duration to a data pulse interval, transition detection means (144) responsive to the samples from the input multiplexing means for detecting pulse state transitions on each data source and for generating an output stream of state transition signals in response thereto, means (150) operated by prescribed one or ones of the receiver clock signals defining a first predetermined subinterval in the first half of a nominal pulse interval and by other prescribed one or ones of the clock signals defining a second predetermined subinterval in the second half of a nominal pulse interval for detecting pulse transitions from the detecting means occurring during the first and second subintervals, means (242) for storing identifications of sources on which pulse transitions are detected in the first and second subintervals and indications of the respective subintervals in which the transitions are detected for each source, means (150, 152, 154) responsive to the stored identifications and indications for selecting a sample from each data source from among the plural samples generated during each consecutive time period, and output means (146) for sequentially transmittng the selected samples from each data source onto an ouput data source (132).

2. The invention of claim 1 further comprising a plurality of the shared data receivers (SDR1–SDR16) each for sampling pulses from a different plurality of incoming data sources, and output multiplexing means (134) connected to the output means of each of the shared data receivers for cyclically and sequentially multiplexing the selected samples from each shared data receiver onto a second output data source (136).

3. The invention of claim 1 wherein the input sequential samples generated by the input multiplexing means during any consecutive time period equal to a pulse interval consists of plural groups of samples with each group containing one sample from each data source, and wherein the sample selecting means further comprises means (150, 152, 154) responsive to pulse transition signals from the pulse transition detection means for selecting samples for each data source from a group in which pulse transitions are not occurring for that data source.

4. The invention of claim 3 wherein the transition detection means further comprises
   delays means (200) for delaying the samples from the input multiplexing means by an amount of time corresponding to one group of samples, and
   logic means (202, 204, 206, 208, 210) for comparing input and output samples of the delay means to generate the pulse transition signals.

5. The invention of claim 4 wherein the sample selecting means further comprises
   means (244, 246, 248, 300) responsive to the pulse transition signals for selecting samples for each data source from either a first group or a second group of samples generated during the first half or second half, respectively, of the consecutive time periods.

6. A shared data receiver for receiving pulse data from a plurality of data sources asynchronous with respect to each other and each having substantially identical nominal pulse transmission rates and pulse intervals, comprising
   input multiplexing means (140) operated at an integer multiple rate of the nominal input data source transmission rate, to sequentially and cyclically generate plural groups of samples of the pulse states of each of the data sources during consecutive time periods each equal to the nominal pulse duration, wherein each group contains one sample from each data source,
   a shift register (200) for receiving samples from the input multiplexing means and having a number of stages equal to an integer multiple of the number of data sources,
   logic circuitry (202, 204, 206, 208, 210) connected to an input and output of the shift register for generating pulse transition signals for each of the lines,
   means (150) enabled by the pulse transition signals for detecting pulse transitions occurring in a prescribed group in the first half of each consecutive time period and for detecting pulse transitions occurring in a prescribed group in the second half of each consecutive time period,
   means (152) for generating a signal stream in time correspondence with the sample stream from the input multiplexing means and containing signal states identifying the group in which the last pulse transition was detected for each data source, and
   means (154) responsive to the signal stream for selecting from the plural samples from the input multiplexing means representative samples of each pulse on each data source.

7. A method of receiving pulse data from a plurality of input data sources asynchronous with respect to each other and having substantially identical nominal pulse transmission rates and pulse durations, comprising the steps of
   sequentially generating samples of the pulse state of each data source at a rate equal to an integer multiple of the nominal pulse rate of the data sources,
   dividing each receiver time interval equal to a nominal pulse duration into a plurality of subintervals,
   detecting pulse transitions occurring during a first prescribed subinterval in the initial half of a time interval and a second prescribed subinterval in the remaining half of a time interval for each of the data sources,
   storing a signal identifying a third prescribed subinterval occurring in the half of the time intervals opposite the half in which a pulse transition has been detected for each data source, and
   outputting samples for each data source generated during the subinterval indicated by the identifying signal associated with each data source.

8. The invention of claim 7 further comprising the step of
   selectively maintaining the identifying signals for each data source until a subsequent pulse transition signal occurring during the first or second prescribed subinterval necessitates a change to the opposite sample selection subinterval.

* * * * *